United States Patent
Navale et al.

(10) Patent No.: US 10,865,685 B2
(45) Date of Patent: Dec. 15, 2020

(54) EXHAUST GAS FLOW CONTROL SYSTEM FOR A METAL HYDRIDE AIR CONDITIONING UNIT

(71) Applicant: THERMAX LIMITED, Pune (IN)

(72) Inventors: Devadatta Pundlik Navale, Pune (IN); Amol Jambukumar Bharamgonda, Pune (IN)

(73) Assignee: THERMAX LIMITED, Maharashtra (IN)

( * ) Notice: Subject to any disclaimer, the term of this patent is extended or adjusted under 35 U.S.C. 154(b) by 50 days.

(21) Appl. No.: 16/312,733

(22) PCT Filed: Jun. 27, 2017

(86) PCT No.: PCT/IB2017/053825
§ 371 (c)(1),
(2) Date: Dec. 21, 2018

(87) PCT Pub. No.: WO2018/002816
PCT Pub. Date: Jan. 4, 2018

(65) Prior Publication Data
US 2019/0170044 A1    Jun. 6, 2019

(30) Foreign Application Priority Data
Jun. 27, 2016    (IN) .............................. 201621022020

(51) Int. Cl.
*F01N 3/20* (2006.01)
*F01N 3/28* (2006.01)
(Continued)

(52) U.S. Cl.
CPC ....... *F01N 3/2892* (2013.01); *B60H 1/00371* (2013.01); *B60H 1/3201* (2013.01);
(Continued)

(58) Field of Classification Search
CPC .......... F01N 1/00; F01N 3/208; F01N 3/2891; F01N 5/02; F01N 9/00; F01N 11/00;
(Continued)

(56) References Cited

U.S. PATENT DOCUMENTS

| | | | |
|---|---|---|---|
| 2,287,172 A | 6/1942 | Harrison | |
| 5,450,721 A * | 9/1995 | Golben | ............... B01D 53/9454 60/274 |
| 2005/0274493 A1* | 12/2005 | Golben | ..................... B60H 1/32 165/104.12 |

FOREIGN PATENT DOCUMENTS

CN    2721436    8/2005

* cited by examiner

*Primary Examiner* — Marc E Norman
(74) *Attorney, Agent, or Firm* — Cowan, Liebowitz & Latman, P.C.; Mark Montague

(57) ABSTRACT

An exhaust gas flow control system disclosed relates to the field of mechanical engineering. The system reduces exhaust gas back pressure exerted on an internal combustion engine and prevents excessive heat loss in a radiator. The system comprises a flow regulator connected to an outlet of a silencer and configured to selectively direct the flow of exhaust gases to a metal hydride heat pump and/or a tailpipe. The flow of exhaust gases is directed towards the metal hydride heat pump in case of increased cooling requirement in the vehicle, and to the tailpipe in case of no cooling requirement or maintenance of the metal hydride heat pump. In case of reduced cooling requirement, partial flow of exhaust gases is directed to the metal hydride heat pump and the remaining to the tailpipe. A diverter is configured within the flow regulator to selectively direct the flow of exhaust gases.

14 Claims, 5 Drawing Sheets

(51) Int. Cl.
*F01N 5/02* (2006.01)
*B60H 1/00* (2006.01)
*B60H 1/32* (2006.01)
*F01N 9/00* (2006.01)
*F01N 11/00* (2006.01)
*F01N 1/00* (2006.01)
*F25B 27/02* (2006.01)
*F25B 17/12* (2006.01)

(52) U.S. Cl.
CPC ........... *B60H 1/32014* (2019.05); *F01N 1/00* (2013.01); *F01N 3/208* (2013.01); *F01N 5/02* (2013.01); *F01N 9/00* (2013.01); *F01N 11/00* (2013.01); *F25B 27/02* (2013.01); *F01N 2900/14* (2013.01); *F01N 2900/1404* (2013.01); *F01N 2900/1406* (2013.01); *F01N 2900/1411* (2013.01); *F01N 2900/1602* (2013.01); *F01N 2900/1622* (2013.01); *F25B 17/12* (2013.01); *Y02A 50/2322* (2018.01); *Y02T 10/47* (2013.01)

(58) Field of Classification Search
CPC ......... F01N 2900/14; F01N 2900/1401; F01N 2900/1406; F01N 2900/1411; F01N 2900/1602; F01N 2900/1622; B60H 1/031; B60H 1/3201; B60H 1/32011; F25B 27/02; Y02A 50/2322; Y02T 10/47
See application file for complete search history.

EXHAUST GAS FLOW CONTROL SYSTEM FOR A METAL HYDRIDE AIR CONDITIONING UNIT

CROSS REFERENCE TO RELATED APPLICATIONS

This is a U.S. national stage of application No. PCT/IB2017/053825, filed on Jun. 27, 2017. Priority under 35 U.S.C. § 119(a) and 35 U.S.C. § 365(b) is claimed from Indian Patent Application No. 201621022020, filed on Jun. 27, 2016, the disclosures of which are incorporated herein by reference.

FIELD

The present disclosure relates to the field of mechanical engineering. Particularly, the present disclosure relates to the field of exhaust gas flow control systems.

BACKGROUND

A conventional metal hydride air conditioning unit used in vehicles works at different load levels depending upon cooling air requirements. The system requires a flow of exhaust gases from an internal combustion engine of the vehicle for operation thereof. For no load operation, the system requires to bypass all the exhaust gases. However, the conventional metal hydride air conditioning unit is placed after the internal combustion engine and before a catalytic converter. This arrangement does not allow complete bypass of exhaust gases, in case of no load or maintenance of the metal hydride heat pump. Further, a heat exchanger of the metal hydride air conditioning unit is exposed to the harmful emissions of the exhaust gases. The upstream and downstream pressure difference in the heat exchanger is also very high, which results in increased stress and reduced reliability of equipment used in the system.

Therefore, there is felt a need of an exhaust gas flow control system that alleviates the above mentioned drawbacks and ensures a trouble free operation of the internal combustion engine along with reducing overheating of the engine.

Objects

Some of the objects of the present disclosure, which at least one embodiment herein satisfies, are as follows:

An object of the present disclosure is to provide an exhaust gas flow control system for a metal hydride air conditioning unit that reduces exhaust gas back pressure exerted on an internal combustion engine.

Another object of the present disclosure is to provide an exhaust gas flow control system for a metal hydride air conditioning unit that prevents excessive heat loss in a radiator.

Another object of the present disclosure is to provide an exhaust gas flow control system for a metal hydride air conditioning unit that prevents the exposure of harmful exhaust gases to the components thereof.

Other objects and advantages of the present disclosure will be more apparent from the following description, which is not intended to limit the scope of the present disclosure.

SUMMARY

The present disclosure envisages an exhaust gas flow control system for a metal hydride air conditioning unit to be used in a vehicle. The vehicle is driven by an internal combustion engine which is connected to a silencer typically via a catalytic converter. The system comprises a flow regulator, a control mechanism, and a user input device. The flow regulator is in fluid communication with the silencer to receive the flow of exhaust gases. The flow regulator is further configured to selectively divert the flow of exhaust gases to a metal hydride heat pump and/or a tailpipe, depending upon the cooling requirements, to release the exhaust gases into the atmosphere. The control mechanism is configured to control the action of the flow regulator. In one embodiment, the user input device is configured to operate the control mechanism by defining a desired temperature that can be set by a user. Based on the desired temperature set by the user, the control mechanism controls the action of the flow regulator. In another embodiment, the user input device is configured to operate the control mechanism directly, which in turn, controls the action on the flow regulator.

BRIEF DESCRIPTION OF THE ACCOMPANYING DRAWING

The exhaust gas flow control system for a metal hydride air conditioning unit, of the present disclosure, will now be described with the help of the accompanying drawing, in which.

LIST OF REFERRAL NUMERALS

100—Conventional exhaust gas system
102—Internal combustion engine
104—Exhaust gas filtration and emission control system
106—Silencer
108—Tailpipe
110—Atmosphere
200—Exhaust gas flow control system, in accordance with an embodiment of the present disclosure 202—Internal combustion engine
204—Exhaust gas filtration and emission control system
206—Silencer
208—Flow regulator
208a—Inlet port of the flow regulator 208
208b—First outlet port of the flow regulator 208
208c—Second outlet port of the flow regulator 208
208d—Diverter
210—Metal hydride heat pump
212—Tailpipe
214—Control mechanism
216—User input device
218—Atmosphere
220—Sensing unit
300—Exhaust gas flow control system, in accordance with another embodiment of the present disclosure
302—Internal combustion engine
304—Exhaust gas filtration and emission control system
306—Silencer
308—Flow regulator
308a—Inlet port of the flow regulator 308
308b—Outlet port of the flow regulator 308
310—Metal hydride heat pump
312—Tailpipe
314—Control mechanism
316—User input device
318—Atmosphere
320—Sensing unit
350—Metal hydride heat pump
360—LT part
370—HT part
400—Vehicle

DETAILED DESCRIPTION

Figure 1:
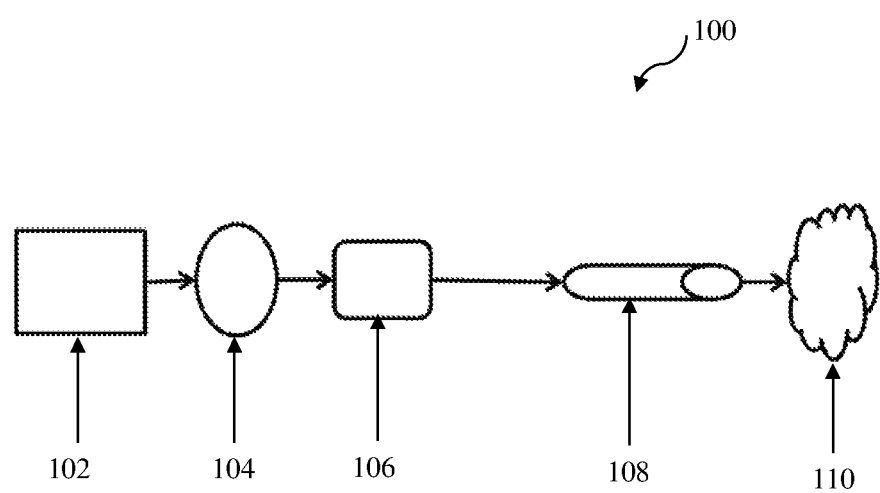
FIG. 1 illustrates a schematic view of a conventional exhaust gas system.

FIG. 1 illustrates a schematic view of a conventional exhaust gas system 100 in a vehicle. The conventional exhaust gas system 100 comprises an internal combustion engine 102, an exhaust gas filtration and emission control system 104 (or a catalytic converter), a silencer 106, and a tailpipe 108. Exhaust gases released by the internal combustion engine 102 are filtered in the exhaust gas filtration and emission control system 104 and is further released into the atmosphere 110 via the silencer 106 and the tailpipe 108. In a conventional arrangement, a heat recovery unit is disposed in the exhaust gas path to utilize the heat of the exhaust gases. This arrangement exerts back pressure on the internal combustion engine 102, which leads to deterioration in the performance of the internal combustion engine 102. Further, the backflow of the exhaust gases increases the heat generated, thereby overloading a cooling system of the internal combustion engine 102.

The present disclosure envisages an exhaust gas flow control system that selectively directs the flow of exhaust gases towards a metal hydride heat pump, and/or a tailpipe of the vehicle to avoid creation of back pressure within the system.

The exhaust gas flow control system, of the present disclosure, comprises a flow regulator. The flow regulator is configured to selectively direct the flow of the exhaust gases to the metal hydride heat pump and/or the tailpipe depending upon the cooling requirement of the space within a vehicle. The flow regulator is in fluid communication with a silencer. The silencer is connected to an internal combustion engine, preferably via a catalytic converter. A control mechanism is configured to control the flow regulator. The control mechanism is configured to control the flow regulator manually or automatically. The control mechanism is controlled manually by a user who directly operates the opening and closing of the flow regulator, the control mechanism is controlled automatically by a user by defining a desired temperature, based on which the control mechanism acts on the flow regulator. If the cooling requirement within the space of the vehicle increases, the flow regulator is used to direct the flow towards the metal hydride heat pump, and restrict any amount of the exhaust gases from entering into the tailpipe. As a result of this, the full flow of the exhaust gases passes through the metal hydride heat pump, thereby achieving the required cooling of the space within the vehicle. As the cooling requirement reduces, the flow regulator can be used to direct the flow to the tailpipe. In case of maintenance of the metal hydride heat pump, the flow regulator can be used to direct the full flow of the exhaust gases towards the tailpipe, therefore keeping the vehicle in operation. Further, the flow regulator is configured to direct a partial flow of the exhaust gases towards the metal hydride heat pump and the remaining flow towards the tailpipe in case of reduced cooling requirement or load.

Figure 2:
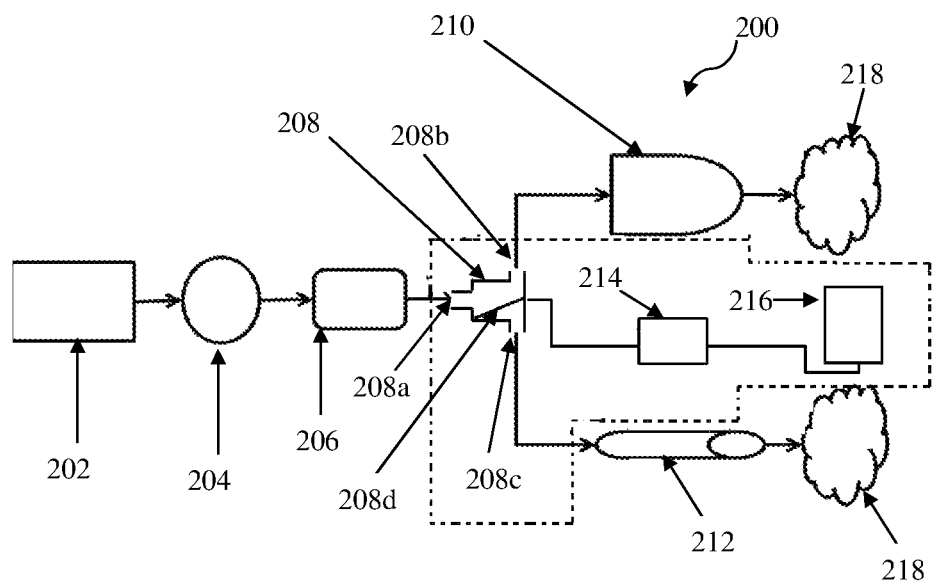
FIG. 2 illustrates a schematic view of an exhaust gas flow control system, in accordance with an embodiment of the present disclosure.

FIG. 2 illustrates a schematic view of an exhaust gas flow control system 200 (hereinafter referred to as the system 200) for a metal hydride air conditioning unit for a vehicle, in accordance with an embodiment of the present disclosure.

The system 200 comprises a flow regulator 208, a control mechanism 214, and a user input device 216.

An exhaust port of an internal combustion engine 202 is connected to an exhaust gas filtration and emission control system 204 (or a catalytic converter) which is further connected to an inlet port of a silencer 206. An outlet port of the silencer 206 is connected to an inlet port 208a of the flow regulator 208. The flow regulator 208 has two outlets, viz., a first outlet port 208b and a second outlet port 208c. The first outlet port 208b of the flow regulator 208 is connected to an inlet port of a metal hydride heat pump 210. The second outlet port 208c of the flow regulator 208 is connected to an inlet port of a tailpipe 212. The metal hydride heat pump 210 acts as a heat exchanger.

In a preferred embodiment, the flow regulator 208 is a three-way valve.

Exhaust gases from the silencer 206 enter the inlet port 208a of the flow regulator 208. As the first outlet port 208b and the second outlet port 208c are in fluid communication with the metal hydride heat pump 210 and the tailpipe 212 respectively, the exhaust gases are released via outlets of the metal hydride heat pump 210 and the tailpipe 212 into the atmosphere 218. This arrangement provides free passage to the exhaust gases to flow into the atmosphere 218, thereby ensuring trouble free and independent operation of the internal combustion engine 202. The flow regulator 208 includes a diverter 208d positioned therewithin that directs the flow of the exhaust gases.

In an operative configuration, when there is no load on the metal hydride heat pump 210, i.e., no cooling requirement, the flow regulator 208 directs the flow of exhaust gases to the tailpipe 212 using the diverter 208d. The diverter 208d closes the first outlet port 208b of the flow regulator 208, thereby restricting the flow to pass through the first outlet port 208b. When there is increase in load on the metal hydride heat pump 210, i.e., increase in cooling requirement, the flow regulator 208 is used to direct the flow of exhaust gases to the metal hydride heat pump 210 using the diverter 208d. The diverter 208d closes the second outlet port 208c of the flow regulator 208, thereby restricting the flow to pass to the tailpipe 212. In case of lower cooling requirement, the diverter 208d directs partial flow of the exhaust gases to the metal hydride heat pump 210 via the first outlet port 208b, and the remaining flow of exhaust gases to the tailpipe 212 depending upon the cooling requirement. The flow regulator 208 is operated manually by an operator or a user who sets the cooling requirement manually.

The flow regulator 208 is operated via the control mechanism 214. The control mechanism operates the diverter 208d. The user input device 216 is configured to receive cooling requirements of the space from the user according to which the control mechanism 214 changes the position of the diverter 208d.

The user input device 216 is a lever or an electrical switch configured to actuate the control mechanism 214 as per the cooling requirements.

In an embodiment, the user input device 216 is implemented by mechanical means, such as a lever, that is mechanically connected and configured to control the movement of the diverter 208d via the control mechanism 214 using a mechanical linkage having gear system for performing the movement of the diverter.

In another embodiment, the mechanical movement of the lever triggers a hydraulic pressure action or pneumatic pressure action on the control mechanism 214, causing the control mechanism 214 to move the diverter 208d.

In yet another embodiment, the lever is configured to send an electrical signal to the control mechanism 214 by implementing an electrical switch circuit that performs switching based on the lever movement.

In another embodiment, the user input device 216 is implemented by electrical means that uses a switch, such as a rotary switch, that is configured to control the movement of the diverter by control mechanism 214 by sending electrical signals to the control mechanism 214 by implementing an electrical switch circuit that performs switching based on the physical movements of the rotary switch.

Figure 3:
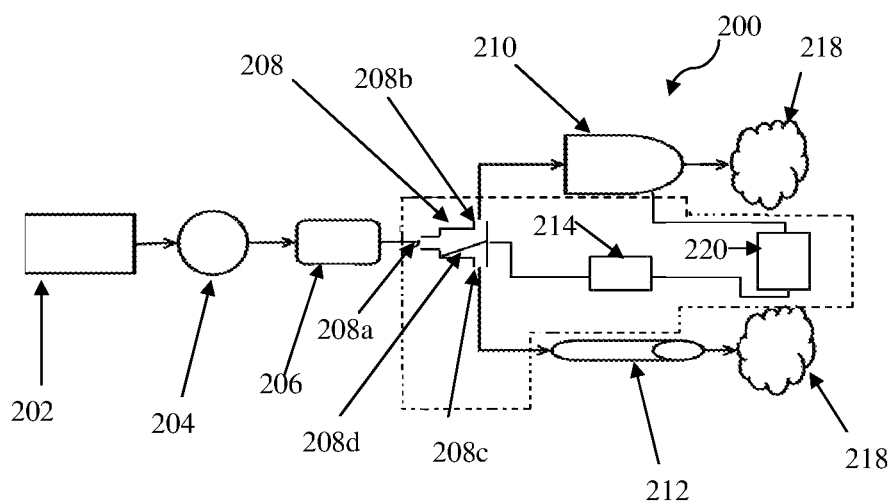
FIG. 3 illustrates a schematic view of the exhaust gas flow control system, in accordance with another embodiment of the present disclosure.

FIG. 3 illustrates a schematic view of the exhaust gas flow control system 200 for metal hydride air conditioning unit for the vehicle, in accordance with another embodiment of the present disclosure. In this embodiment, a sensing unit 220 is used to operate the control unit automatically. The sensing unit 220 is an automatic actuator that actuates the control mechanism 214.

The sensing unit 220 is in communication with the metal hydride heat pump 210 and the control mechanism 214. The sensing unit is configured to:

sense various reaction kinetics and operational parameters of the metal hydride heat pump 210, including, but not limited to, parameters associated with exhaust gas mass flow and pressure, exhaust gas temperature, ambient temperature, hydrogen absorption and desorption rates and a desired temperature defined by a user;

sense the temperature of the space within the vehicle;

calculate the amount of exhaust gases to be supplied to the metal hydride heat pump 210 depending upon the desired temperature defined by the user, temperature sensed within the space and the reaction kinetics and the operational parameters, in accordance with a set of instructions pre-stored in at least one memory module of the sensing unit;

calculate the time period for which the flow of exhaust gases is to be directed to the metal hydride heat pump 210 taking into consideration the flow parameters of the exhaust gas coming from the engine such as its mass flow rate and temperature; and actuate the control mechanism 214, in accordance with the calculated amount of exhaust gases to be supplied and the calculated time period for which the flow of exhaust gases needs to be directed to the metal hydride heat pump 210.

The sensing unit 220 includes a memory unit configured to store at least one value from the group consisting of temperature of the space within the vehicle, the reaction kinetics and operational parameters of the metal hydride heat pump 210, the amount of exhaust gases required to be passed through the metal hydride heat pump 210 for a particular cooling requirement, and the time for which the exhaust gases are to be passed through the metal hydride heat pump 210. The sensing unit has a processor that calculates the amount of exhaust gases and the time period for which the exhaust gases need to be directed to the metal hydride heat pump 210 based on a set on instructions pre-installed in the memory and the above sensed parameters stored in the memory. For example, when the vehicle is running and the engine is in operation, if the temperature in the space to be cooled within the vehicle is set at 20 degrees Celsius and the temperature outside the vehicle is 30 degrees Celsius, then the sensing unit senses both these values, stores them in its memory and calculates the amount of exhaust gases to be supplied to the metal hydride unit along with the time period for which the flow of exhaust gases needs to be directed to the metal hydride heat pump, considering flow parameters like the mass flow rate and temperature of the exhaust gas coming from the engine.

In an operative configuration, the sensing unit 220 is configured to sense various reaction kinetics and operational parameters of the metal hydride heat pump 210 and the temperature of the space within the vehicle. The sensing unit 220 compares the sensed parameters with the stored predetermined value and calculates the amount of exhaust gases to be passed and the time period for which the exhaust gases are to be passed through the metal hydride heat pump 210. Depending upon the calculated parameters, the sensing unit actuates the control mechanism 214 by sending a signal to it, and which in turn moves the diverter 208d of the flow regulator 208 in such a way that the calculated flow of exhaust gases is passed through the first outlet port 208b to the metal hydride heat pump 210. The control mechanism 214 receives the signal from the sensing unit depending upon the cooling requirements. The control mechanism 214 then moves the diverter 208d to:

completely open the first outlet port 208b and close the second outlet port 208c;

completely open the second outlet port 208c and close the first outlet port 208b; or partially open the first outlet port 208b and the second outlet port 208c as per the cooling requirement.

The sensing unit 220 is configured to receive and store various parameters, e.g., the required temperature of the space within the vehicle, from the user. These parameters are considered as cooling requirements from the user and based on that the flow of exhaust gases is directed towards the metal hydride heat pump 210 and/or to the tailpipe 212.

Figure 4:
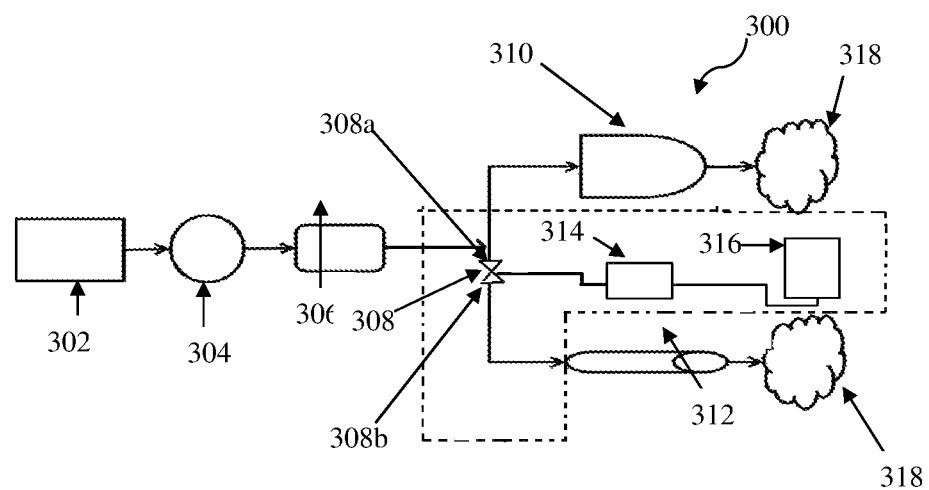
FIG. 4 illustrates a schematic view of the exhaust gas flow control system, in accordance with yet another embodiment of the present disclosure.

FIG. 4 illustrates a schematic view of an exhaust gas flow control system 300 for a metal hydride air conditioning unit (hereinafter referred to as system 300) for the vehicle, in accordance with another embodiment of the present disclosure.

The system 300 comprises a flow regulator 308, a control mechanism 314, and a user input device 316.

An exhaust port of an internal combustion engine 302 is connected to an exhaust gas filtration and emission control system 304 (or a catalytic converter), which is further connected to an inlet port of a silencer 306.

The flow regulator 308 has one inlet port 308a and one outlet port 308b. The outlet port 308b is connected to an inlet port of a tailpipe 312. The inlet port 308a of the flow regulator 308 is in fluid communication with an outlet port of the silencer 306 and an inlet port of a metal hydride heat pump 310. The metal hydride heat pump 310 acts as a heat exchanger.

In a preferred embodiment, the flow regulator 308 is a two-way valve.

The inlet port 308a of the flow regulator 308 receives the stream of exhaust gas from the silencer 306 and has the outlet port 308b that leads the exhaust gases into the atmosphere 318. There is no restriction in the exhaust gas line connecting the silencer 306 and the metal hydride heat pump 310. Exhaust gases are rejected to the atmosphere 318 either from the metal hydride heat pump 310 or from both the tailpipe 312 and the metal hydride heat pump 310. This arrangement also ensures free passage for the exhaust gas to flow to ambient temperature, which is vital for trouble free and independent operation of the internal combustion engine 302.

Depending on the cooling requirement, a control mechanism 314 is used to move a diverter (not shown in figures) within the flow regulator 308, thereby closing or opening the outlet port 308b of the flow regulator 308. As the cooling requirement increases, the control mechanism 314 is used to move the diverter to completely close the outlet port 308b of the flow regulator 308, thereby directing full flow of the exhaust gases to the metal hydride heat pump 310 to achieve the required cooling. As the cooling requirement reduces, the control mechanism 314 is used to open the outlet port 308b of the flow regulator 308 to direct the flow of exhaust gases towards the tailpipe 312, and reduce the amount of flow to the metal hydride heat pump 310. For maximum cooling, the outlet port 308b of the flow regulator 308 is kept closed by the diverter to ensure maximum flow of the exhaust gases to the metal hydride heat pump 310.

The flow regulator 308 is configured in such a way that a continuous flow of the exhaust gases to the metal hydride heat pump 310 is maintained. In the closed position of the flow regulator 308, full flow of exhaust gases is directed towards the metal hydride heat pump 310, whereas in the open position of the flow regulator 308, a partial flow of exhaust gases is directed to the metal hydride heat pump 310.

The flow regulator 308 is operated manually by an operator or a user who sets the cooling requirement manually.

The flow regulator 308 is operated via the control mechanism 314. The control mechanism operates the diverter inside the flow regulator 308. The user input device 316 is configured to receive the cooling requirements of the space from the user according to which the control mechanism 314 changes the position of the diverter.

The user input device 316 is a lever or an electrical switch configured to actuate the control mechanism 314 as per the cooling requirements.

In an embodiment, the user input device 316 is implemented by mechanical means, such as a lever, that is mechanically connected and configured to control the movement of the diverter via the control mechanism 314 using a mechanical linkage having gear system for performing the movement of the diverter.

In another embodiment, the mechanical movement of the lever triggers a hydraulic pressure action or pneumatic pressure action on the control mechanism 314, causing the control mechanism 314 to move the diverter.

In yet another embodiment, the lever is configured to send an electrical signal to the control mechanism 314 by implementing an electrical switch circuit that performs switching based on the lever movement.

In another embodiment, the user input device 316 is implemented by electrical means that uses a switch, such as a rotary switch, that is configured to control the movement of the diverter by control mechanism 314 by sending electrical signals to the control mechanism 314 by implementing an electrical switch circuit that performs switching based on the physical movements of the rotary switch.

Figure 5:
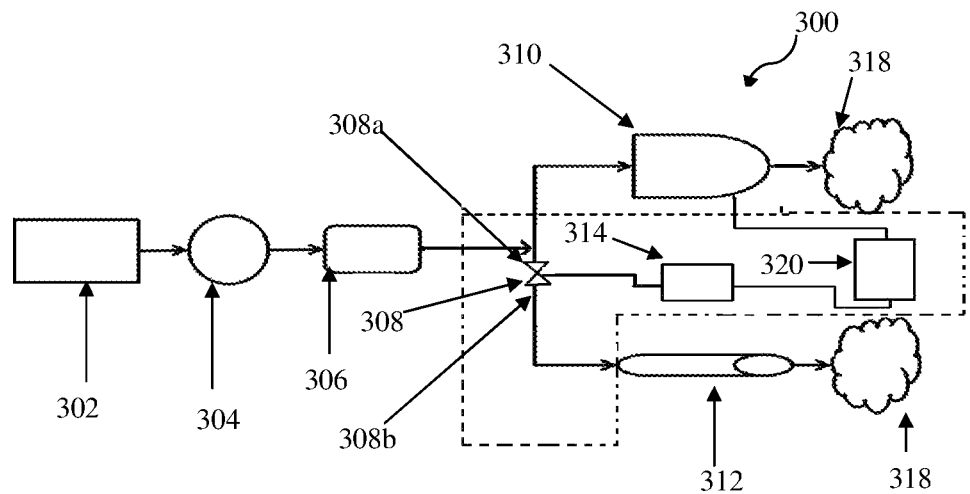
FIG. 5 illustrates a schematic view of the exhaust gas flow control system, in accordance with still another embodiment of the present disclosure.

FIG. 5 illustrates a schematic view of the exhaust gas flow control system 300 for a metal hydride air conditioning unit for the vehicle, in accordance with yet another embodiment of the present disclosure. This embodiment implements a sensing unit 320 which is configured to actuate the control mechanism 314 automatically as per the cooling requirements.

The sensing unit 320 is configured to:
sense various reaction kinetics and operational parameters of the metal hydride heat pump 310, including, but not limited to, parameters associated with the exhaust gas mass flow and pressure, exhaust gas temperature, ambient temperature, hydrogen absorption and desorption rates and a desired temperature defined by a user;
sense the temperature of the space within the vehicle;
calculate the amount of exhaust gases to be supplied to the metal hydride heat pump 310 depending upon the desired temperature defined by the user, temperature sensed within the space and the reaction kinetics and the operational parameters, in accordance with a set of instructions pre-stored in at least one memory module of the sensing unit;
calculate the time period for which the flow of exhaust gases is to be directed to the metal hydride heat pump 310 taking into consideration the flow parameters of the exhaust gas coming from the engine such as its mass flow rate and temperature; and
actuate the control mechanism 314, in accordance with the calculated amount of exhaust gases to be supplied and the calculated time period for which the flow of exhaust gases needs to be directed to the metal hydride heat pump 310.

The sensing unit 320 includes a memory unit configured to store at least one value from the group consisting of temperature of the space within the vehicle, the reaction kinetics and operational parameters of the metal hydride heat pump 310, the amount of exhaust gases required to be passed through the metal hydride heat pump 310 for a particular cooling requirement, and the time for which the exhaust gases are to be passed through the metal hydride heat pump 310.

In an operative configuration, the sensing unit 320 is configured to sense various reaction kinetics and operational parameters of the metal hydride heat pump 310 and the temperature of the space within the vehicle. The sensing unit 320 compares the sensed parameters with the stored predetermined value and calculates the amount of exhaust gases to be passed and the time period for which the exhaust gases are to be passed through the metal hydride heat pump 310. Depending upon the calculation, the sensing unit actuates the control mechanism 314, which in turn moves the diverter of the flow regulator 308 in such a way that the calculated flow of exhaust gases is passed to the metal hydride heat pump 310. The control mechanism 314 receives a signal from the sensing unit depending upon the cooling requirements. The control mechanism 314 then moves the diverter to:
  completely open the outlet port 308b for minimum flow of exhaust gases to the metal hydride heat pump 310, if the cooling requirement reduces or no cooling required; or
  completely close the outlet port 308b to allow full flow of exhaust gases to the metal hydride heat pump 310, if the cooling requirement increases.
  partially open the outlet port 308b to allow partial flow of the exhaust gases to the metal hydride heat pump 310, as required by the cooling requirement.

The sensing unit 320 is configured to receive and store various parameters, e.g., temperature of the space within the vehicle, from the user. These parameters are considered as cooling requirements from the user and based on that, the flow of exhaust gases is directed either towards the metal hydride heat pump 310 or to the tailpipe 312.

The exhaust gases are directed towards a HT side metal hydride heat pump. The heat in the exhaust gases is used to initiate the hydrogen desorption process within the metal hydride heat pump. Further, cooling of the air within the space of the vehicle is achieved by using the metal hydride heat pump. The metal hydride heat pump of the exhaust gas flow control system of the present disclosure is placed after the exhaust filtration and emission control system and the silencer. This arrangement eliminates the high pressure difference experienced by the system elements, making the system more reliable. This also ensures that the metal hydride heat pump (or heat exchanger unit) is not exposed to the harmful emissions contained in the exhaust gas stream. As exhaust gas is immediately released into the atmosphere from the metal hydride heat pump, the operating pressures will be up to 10-20 mmWC (gauge) which are an order of magnitude less than that of conventional heat recovery arrangement. Lower operating pressures of the metal hydride heat pump in the proposed arrangement results in reduced air leakages in the diverters, valves and air seals resulting in better heat recovery and performance.

Figure 6:
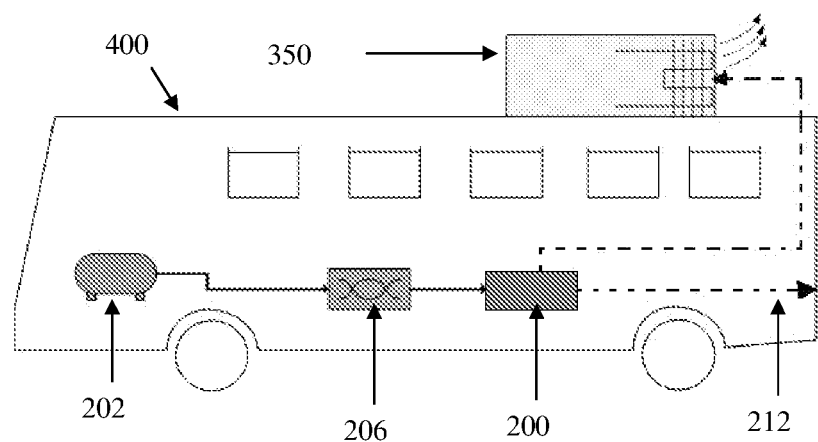
FIG. 6 illustrates a side view of the vehicle having a combined type metal hydride heat pump unit with exhaust gas flow control system of the present disclosure disposed therein.
Figure 7:
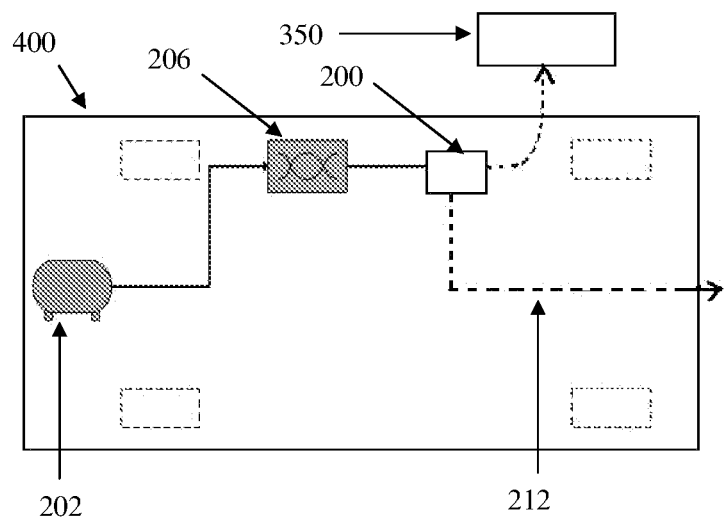
FIG. 7 illustrates a top view of the vehicle having the combined type metal hydride heat pump unit with the exhaust gas flow control system of the present disclosure disposed therein.

FIG. 6 illustrates a side view of a vehicle 400 having a combined type metal hydride heat pump 350 with the exhaust gas flow control system 200 of the present disclosure disposed therein. FIG. 7 illustrates a top view of the vehicle 400 having the combined type metal hydride heat pump 350 with the exhaust gas flow control system 200 of the present disclosure disposed therein.

The metal hydride heat pump 350 is placed on a top of the vehicle 400. The outlets of the exhaust gas flow control system 200, of the present disclosure, are connected to the HT side of the metal hydride heat pump 350 and the tailpipe 212. The HT part and LT part of the metal hydride heat pump 350 are placed on the top under the same cover and base to form a single unit. An inlet of the exhaust gas flow control system 200 is connected to the exhaust of the internal combustion engine 202 via the silencer 206. Once the heat in the exhaust gases is absorbed, the cooled exhaust gases are released into the atmosphere, as shown in FIG. 6.

The arrangement shown in FIG. 6 and FIG. 7 ensures:
  minimum length of the exhaust duct leading to reduced heat and pressure loss; and
  release of cooled exhaust gas from the metal hydride heat pump unit at the rear end of the vehicle.

Figure 8:
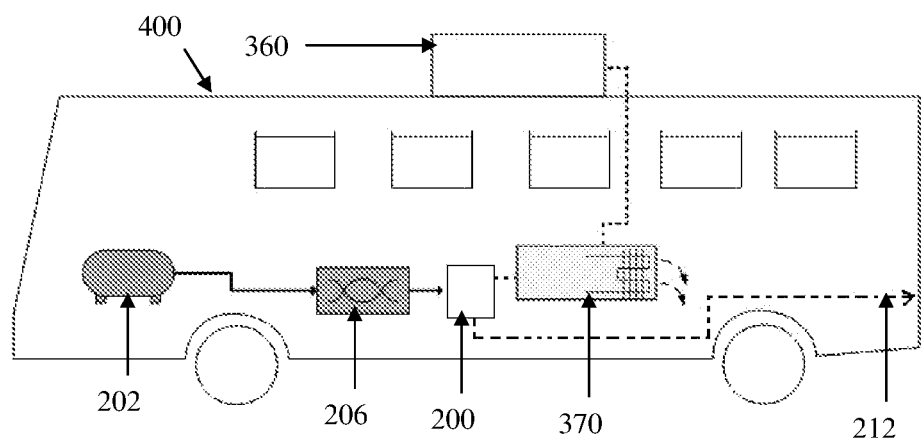
FIG. 8 illustrates a side view of the vehicle having a split type metal hydride heat pump unit with the exhaust gas flow control system of the present disclosure disposed therein.
Figure 9:
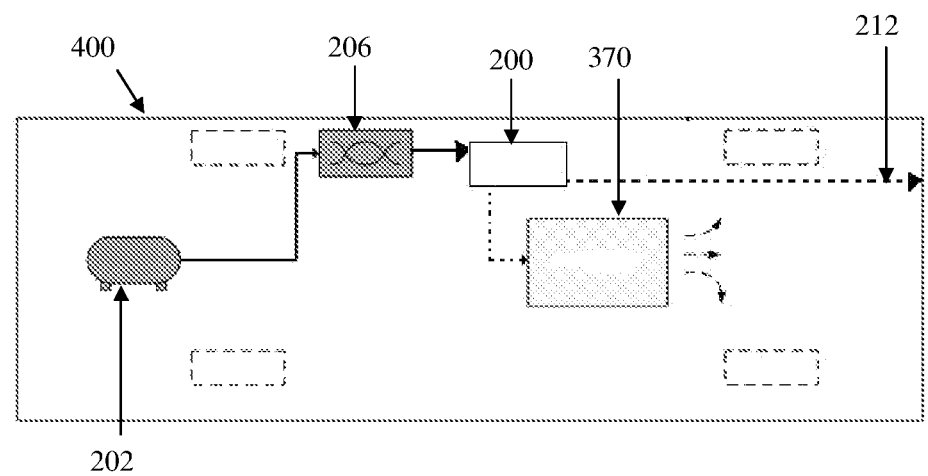
FIG. 9 illustrates a top view of the vehicle having the split type metal hydride heat pump unit with the exhaust gas flow control system of the present disclosure disposed therein.

FIG. 8 illustrates a side view of the vehicle 400 having a split type metal hydride heat pump unit with the exhaust gas flow control system of the present disclosure disposed therein. FIG. 9 illustrates a top view of the vehicle 400 having the split type metal hydride heat pump unit with the exhaust gas flow control system of the present disclosure disposed therein.

As shown in FIG. 8 and FIG. 9, both the LT part 360 and the HT part 370 of the metal hydride heat pump are separate units. The HT part 370 of the metal hydride heat pump is be placed on the chassis of the vehicle 400 but beneath the aisle of the passenger cabin and the LT part 360 is placed on the rooftop of the bus/vehicle. The hydrogen lines routed from the HT part 370 to LT part 360 units are concealed in the side walls of the body of the vehicle 400.

The exhaust gas flow control system 200 is in fluid communication with the HT part 370 of the metal hydride heat pump.

The arrangement shown in FIG. 8 and FIG. 9 ensures:
  minimum pressure drop and reduced heat loss due to uncluttered, simple and efficient exhaust gas duct design; and
  less space is consumed on the rooftop, reducing drag force on the vehicle.

In an embodiment, the exhaust gas flow control system 300 is used to supply the flow of exhaust gases to the metal hydride heat pump 350 of FIG. 6 and FIG. 7, and to the HT part 370 of the metal hydride unit shown in FIG. 8 and FIG. 9.

The exhaust gas flow control system of the present disclosure does not change/degrade the performance of the vehicle even after addition of the exhaust gas flow control system. As the exhaust gas path up to the silencer remains untouched, emissions levels and noise from the engine remain as per the specifications given by the engine manufacturer. Further, the exhaust gas flow control system, of the present disclosure, reduces overheating of the internal combustion engine of the vehicle.

Technical Advancements

The present disclosure described herein above has several technical advantages including, but not limited to, the realization of an exhaust gas flow control system that:
  reduces exhaust gas back pressure exerted on an internal combustion engine;
  prevents excessive heat loss in a radiator; and
  prevents the exposure of harmful exhaust gases to the components thereof.

The disclosure has been described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully revealed the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. An exhaust gas flow control system for a metal hydride air conditioning unit for a vehicle, said vehicle driven by an internal combustion engine connected to a, said system comprising:
   a flow regulator in fluid communication with said silencer and also with a metal hydride heat pump and a tailpipe;
   said flow regulator configured to receive and selectively divert flow of exhaust gases to at least one of said metal hydride heat pump and said tailpipe to release said exhaust gases to the atmosphere;
   a control mechanism configured to control an action of said flow regulator for selectively diverting flow of exhaust gases to at least one of said metal hydride heat pump and said tailpipe; and
   a user input device configured to receive a user input from a user to operate said control mechanism to perform said action of said flow regulator.

2. The system as claimed in claim 1, wherein said flow regulator comprises:
   an inlet port connected to an outlet port of said silencer;
   a first outlet port connected to an inlet port of said metal hydride heat pump;
   a second outlet port connected to an inlet port of said tailpipe; and
   a diverter configured to mechanically move to a required position for selectively diverting the flow of exhaust gases to said first outlet port and said second outlet port, for achieving said action of said flow regulator.

3. The system as claimed in claim 1, wherein said flow regulator comprises:
   an outlet port connected to an inlet of said tailpipe;
   an inlet port in fluid communication with said silencer and said metal hydride heat pump; and
   a diverter configured to mechanically move to a required position for selectively diverting or completely stopping the flow of exhaust gases to said outlet port for achieving said action of said flow regulator.

4. The system as claimed in claim 1, wherein said user input device is a lever or an electrical switch.

5. The system as claimed in claim 1, wherein said user input device is an electrical switch.

6. The system as claimed in claim 1, wherein said control mechanism comprises a mechanical linkage having a gear system.

7. The system as claimed in claim 1, wherein said control mechanism comprises an actuator.

8. The system as claimed in claim 7, wherein said actuator is an electrical actuator, a pneumatic actuator or a hydraulic actuator.

9. The system as claimed in claim 1, wherein said control mechanism (314) comprises an actuator for performing a corresponding mechanical movement of said diverter in accordance to the user input received by said lever.

10. The system as claimed in claim 9, wherein said actuator is an electrical actuator or a pneumatic actuator or a hydraulic actuator.

11. The system as claimed in claim 1, wherein said control mechanism (214, 314) comprises a sensing unit (220, 320) comprising at least one memory module and a processing unit, said sensing unit (220, 320) configured to:
   sense at least one of the reaction kinetics and operational parameters of the metal hydride heat pump (210, 310) and store said at least one reaction kinetics and operational parameter in said at least one memory module;
   sense and store in said at least one memory module, the temperature of the space within said vehicle;
   calculate using said processing unit, the amount of exhaust gases to be supplied to said metal hydride heat pump according to said temperature sensed within the space of said vehicle and said reaction kinetics and operational parameters, based on a set of instructions loaded in said at least one memory module of said sensing unit; and
   based on said amount of exhaust gases calculated, generate a movement signal for causing action on said flow regulator (208, 308) to divert flow of exhaust gases corresponding to said amount of exhaust gases calculated to said metal hydride heat pump.

12. The system as claimed in claim 11, wherein said movement signal causes mechanical movement of said diverter to said required position.

13. The system as claimed in claim 11, wherein said at least one reaction kinetic and operational parameter is a parameter associated with exhaust gas mass flow and pressure, exhaust gas temperature, ambient temperature, hydrogen absorption/desorption rates of said metal hydride heat pump or a desired temperature defined by a user.

14. The system as claimed in claim 1, wherein said vehicle is driven by an internal combustion engine connected to a silencer via a catalytic converter.

* * * * *